July 18, 1961  V. LINDNER  2,992,672
APPARATUS FOR MAKING FALLER BARS
Filed Feb. 13, 1959
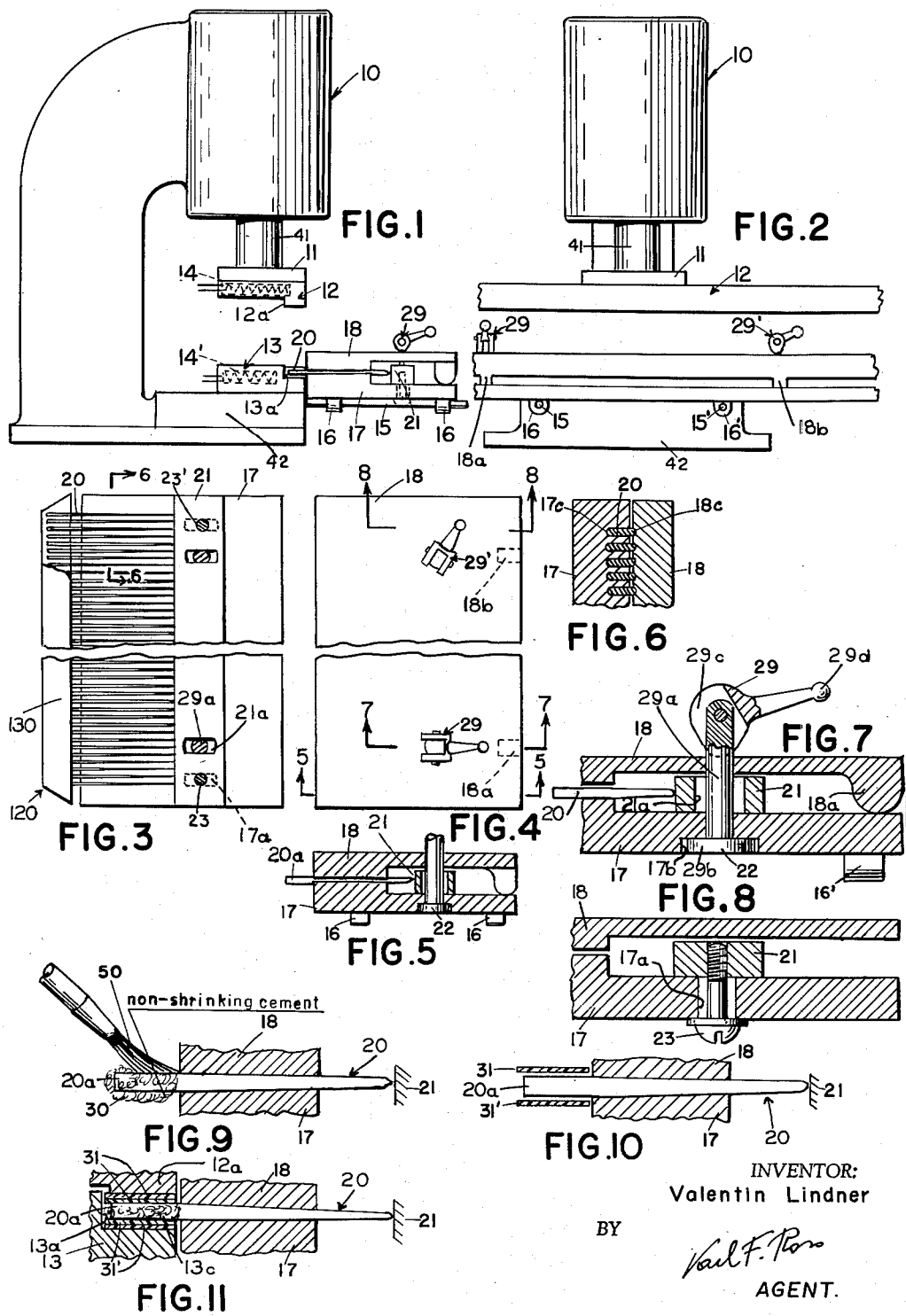
INVENTOR:
Valentin Lindner
BY
AGENT.

United States Patent Office 2,992,672
Patented July 18, 1961

2,992,672
APPARATUS FOR MAKING FALLER BARS
Valentin Lindner, New York, N.Y., assignor to Lenkotex Company, Inc., New York, N.Y., a corporation of New York
Filed Feb. 13, 1959, Ser. No. 793,139
4 Claims. (Cl. 154—1)

My present invention relates to the manufacture of devices in which a multiplicity of elongated elements, such as needles or pins, are removably inserted in a holder to form a comb-like array. Typical of such devices are faller bars, used in gill boxes in the processing of textile fibers, which generally comprise a metallic body provided with a longitudinal groove in which the pins are set close to one another with the aid of a preferably nonshrinking cement. Should one or more pins become damaged in use, the bar may be heated to a temperature high enough to cause decomposition of the cementitious material whereby the pins can be removed and replaced.

It has already been proposed to insure the correct relative positioning of the pins within their metallic holder by providing the box of the pins, prior to their insertion into the holder, with a common plastic base fitting more or less snugly inside the aforementioned groove. For the formation of this base there are available certain thermosetting materials, such as combinations of synthetic rubber and phenol-aldehyde resins, which are commercially obtainable in the shape of strips between which the blunt ends of the pins may be sandwiched. In order to insure adequate anchorage, it has heretofore been the practice to bend some of these strips in U-shape around the box while placing other, flat strips on opposite sides of the shank portions to be imbedded in the holder. A thin coating of adhesive on the shanks and on the strips was used as a temporary bond to hold the material in place before curing was completed.

Even if the pin shanks and the plastic strip material are brought together under considerable pressure, the ultimate product (i.e. the completed faller bar) was sometimes unsatisfactory in that the pins were not all held with the same uniform firmness in the metallic body. I have found that this is due to the existence of voids within the base into which the cementitious filler, serving to anchor the base to the metal holder, cannot penetrate. Moreover, the aforedescribed process is cumbersome and can be applied only with difficulty to larger arrays or "books" of pins whereby it will often be necessary to use two or more pin strips for the longer faller bars.

It is, accordingly, an object of my present invention to provide a process and means for producing a faller bar or similar article in which a row of pins, needles or the like are firmly and uniformly imbedded in an elongated holder.

Another object of my invention is to provide a simplified process for producing a book of pins for the purpose described.

In accordance with this invention I clamp the necessary number of pins or needles next to one another in a suitable fixture and then apply to the projecting shanks thereof a non-shrinking cementitious material which may be identical with that used subsequently for anchoring the pin base to the holder. This cementitious material is so applied as to fill all the interstices between the needle shanks while also forming an adhesive film therearound. Next, I place the projecting shanks between two or more flat strips of thermosetting material, each strip having previously been coated with the aforementioned cement, in such manner that the strips project rearwardly beyond the butt ends of the pins without, however, being bent around these ends. Finally, the strips and the cement are consolidated under heat and pressure around the needle shanks so as to constitute a practically monolithic though not actually homogeneous base in which the shanks are firmly imbedded and which does not contain any voids capable of weakening the bond between the needles and the base. My invention also concerns an apparatus for conveniently carrying out the above process.

These and other objects, features and advantages will become more fully apparent from the following description, reference being made to the accompanying drawing in which:

FIG. 1 is a side-elevational view of an apparatus according to the invention;
FIG. 2 is a partial front-elevational view of the apparatus of FIG. 1;
FIG. 3 is a top plan view of a clamp forming part of the apparatus of FIGS. 1 and 2, with the upper clamp jaw removed;
FIG. 4 is a view similar to FIG. 3 but with the upper clamp jaw in place;
FIG. 5 is a cross-sectional view taken on line 5—5 of FIG. 4;
FIG. 6 is a fragmentary sectional view taken on line 6—6 of FIG. 3;
FIG. 7 is a fragmentary cross-sectional view taken on line 7—7 of FIG. 5, drawn to a larger scale;
FIG. 8 is a fragmentary cross-sectional view taken on line 8—8 of FIG. 4, drawn to the same scale as FIG. 7; and
FIGS. 9, 10 and 11 are fragmentary cross-sectional views of the clamp of FIGS. 3-8 at three successive stages of operation.

The apparatus shown in FIGS. 1 and 2 comprises a pneumatic press, generally designated 10, whose ram 41 terminates in a plate 11 carrying a male die member 12; the complementary female die member 13 is supported on the bed 42 on the press. Member 12 is provided with a depending ledge 12a fitting into a complementary recess 13a of member 13. Both die members 12 and 13 may be provided with internal heating means here shown schematically as resistors 14 and 14'.

Projecting outwardly from press bed 42 are two horizontal rails 15 and 15' which are engaged by pairs of lugs 16 and 16' on the underside of a lower clamp jaw 17 which is thus horizontally displaceable with respect to the die member 13 and which can also be completely detached from the press 10. An upper clamp jaw 18 rests on the lower jaw 17 and is maintained in proper alignment therewith by suitable means including a pair of locks 29, 29'. As best seen in FIG. 7, each of these locks comprises a stem 29a which passes through aligned holes in the two clamp jaws and terminates in a round head 29b received in a circular recess 17b on the underside of lower jaw 17. The top of stem 29a serves as a journal for a bifurcate cam 29c provided with an integral handle 29d so as to be operable to press the upper jaw 18 firmly against the lower jaw 17. The rotatability of head 29b in recess 17b enables the locks 29 and 29' to be swung around into various angular positions and to be conveniently operated in any such position.

A stop bar 21, provided with slots 21a for the passage of the lock stems 29a, is adjustably secured to the lower jaw 17 by means of bolts 23, 23' traversing slots 17a (FIG. 8) in member 17. The bar 21 serves as an abutment for the points of a series of pins or needles 20 which are lodged in relatively deep cuts 17c (FIG. 6) of lower jaw 17 and, upon a tightening of locks 29 and 29', are secured in position by means of the upper jaw 18 whose shallow corrugations 18c are aligned with the cuts 17c. The jaw 18 is also provided, on its side remote from the corrugations 18c, with integral bosses 18a, 18b positioned to bear upon the lower jaw 17 when the clamp is closed.

The butts 20a of pins 20 project from the closed clamp jaws 17 and 18 for a distance which is somewhat less than the width of the recess 13a of female die member 13. With the needle shanks securely held in parallel, coplanar alignment, their projecting rear extremities are coated with a non-shrinking plastic cement 30, such as an epoxy resin, which is put on by a brush 50 (FIG. 9) or other suitable means in such manner as to fill completely the interstices between the shanks. Advantageously, the coating 30 is allowed to stand in air for one or two minutes so as to undergo partial drying. One or more strips 31, 31' of thermosetting material are placed above and below the projecting shank portions 20a so as to extend slightly to the rear thereof (see FIG. 10), the width of the strips preferably corresponding to that of the ledge 12a and the recess 13a of die members 12 and 13. Before the strips 31 and 31' are placed in position, they are also coated with the aforementioned cement. Next, the clamp 17, 18 with the needles 20 and the strips 31, 31' is moved into the position illustrated in FIG. 1, whereupon the heaters 14, 14' are actuated and the ram 41 is caused to descend so as to compress the thermoplastic strips and the cement 30 around the shank extremities 20a. This final step has been illustrated in FIG. 11.

In general, temperatures ranging between 100° and 200° C., pressures of approximately 2 to 7 kilograms per square centimeter (about 30 to 100 pounds per square inch), and treatment times of the order of 1 to 5 minutes will give satisfactory results.

The completed needle book 120, having the pins 20 imbedded in a polymeric base 130, has been shown in FIG. 3 in the position it occupies just before being taken out of the clamp. It can then be inserted by its base into the groove of the metallic holder portion of a faller bar as shown, for instance, in my co-pending application Serial No. 793,140, filed on even date herewith, or of some other, conventional type of faller bar, to which it is anchored with the aid of a suitable bonding agent such as the cementitious material 30. The latter procedure, which is well known per se, does not form part of the present invention and has not been illustrated.

I claim:

1. An apparatus for making inserts for faller bars, comprising a male die member, a female die member, clamp means for holding an array of coplanar elements with corresponding extremities projecting, said female die member being provided with a recess adapted to receive said projecting extremities, said male member having a ledge complementary to said recess, guide means for positioning said clamp means adjacent said female die member with said extremities extending into said recess, and heated press means for compacting a thermosetting substance around said extremities by forcing said ledge into said recess with interposition of said extremities and said substance.

2. An apparatus according to claim 1 wherein said clamp means comprises a first and a second jaw, said first jaw being provided with relatively deep cuts adapted to receive said elements, said second jaw being provided with relatively shallow corrugations aligned with said cuts.

3. An apparatus according to claim 2 wherein said clamp means is provided with a stop bar for said elements adjustably positioned on one of said jaws.

4. An apparatus according to claim 2, further comprising locking means for said clamp means, said locking means including a stem rotatably passing through said jaws and cam means rotatably journaled on a projecting end of said stem.

References Cited in the file of this patent

UNITED STATES PATENTS

| | | |
|---|---|---|
| 1,167,418 | Lennon | Jan. 11, 1916 |
| 2,350,887 | Goff | June 6, 1944 |
| 2,597,885 | Marks | May 27, 1952 |
| 2,606,269 | Craig | Aug. 5, 1952 |
| 2,797,727 | Tadinger | July 2, 1957 |
| 2,874,751 | Norton | Feb. 24, 1959 |